Feb. 24, 1970 R. W. MUNTENDAM 3,496,788

DISC-TYPE MEMORY DEVICE

Filed June 20, 1968 5 Sheets-Sheet 1

Inventor:
Rudolf Wilfried Muntendam
BY Baldwin Wight Diller & Brown
Attorneys

Inventor:
Rudolf Wilfried Muntendam
BY Baldwin Wight Diller & Brown
Attorneys

Inventor:
Rudolf Wilfried Muntendam
BY Baldwin Wight Diller & Brown
Attorneys

Inventor:
Rudolf Wilfried Muntendam
BY Baldwin Wight Diller & Brown
Attorneys

Inventor:
Rudolf Wilfried Muntendam
BY Baldwin Wight Diller & Brown
Attorneys 3,496,788

DISC-TYPE MEMORY DEVICE

Rudolf Wilfried Muntendam, Amsterdam, Netherlands, assignor to Bull General Electric (Nederland) N.V., Amsterdam, Netherlands Filed June 20, 1968, Ser. No. 738,505
Claims priority, application Netherlands, July 7, 1967, 6709506
Int. Cl. F16h *54/04*
U.S. Cl. 74—568 6 Claims

ABSTRACT OF THE DISCLOSURE

The invention concerns a disc-type memory in which actuating blades disposed between two parallel rings fast with a rotative support mounted on a driving shaft are magnetically maintained against one or other of these rings, depending upon whether they occupy an inoperative position or a position for actuating a control member in their passage.

Figure 1:
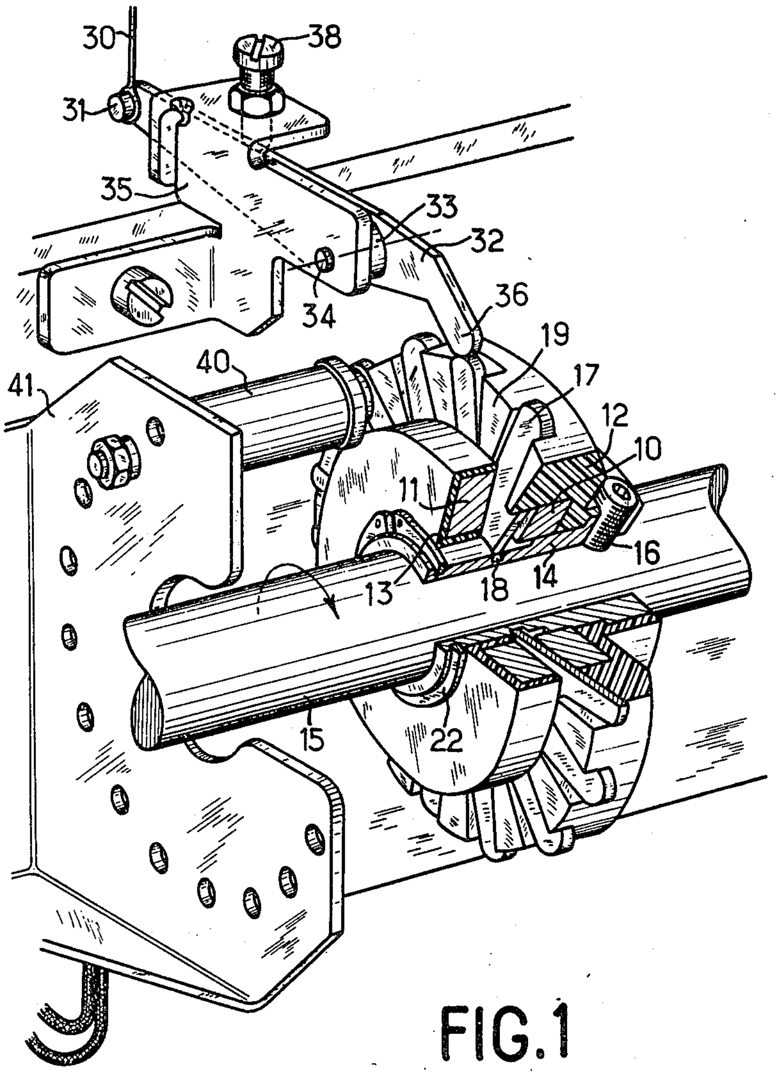

The present invention relates to improvements in disc-type memory devices which are suitable more particularly for use in record-card sorting machines.

In these machines, the cards, which are initially placed in a supply magazine, are extracted one-by-one from the said magazine and carried, by appropriate driving means, along a track provided with receiving compartments which are disposed, for example, below. A selecting member of deflector associated with each compartment may be actuated to deflect certain of the cards which are advanced along the track and to direct them towards the corresponding compartment. Each card is provided with selection control indications which consist of perforations or marks which can be read by appropriate means. As they are extracted from the magazine, the cards pass through a reading station which is situated in that portion of the track which is comprised between the magazine and the receiving compartments and which determines from the selection indications provided on each card, the compartment into which it must pass. Since this determination takes place at the time when the card is passing through the reading station, means are provided to record the selection control and to delay the actuation of the deflector until this card has had time to pass from the reading station to the compartment in which it must arrive.

For this purpose, various means have been proposed to ensure timely actuation of each deflector. Thus, machines are known in which each deflector is maintained by a spring in a position in which it is normally inoperative. The actuation of the deflector, from the reading station, in these machines takes place through a memory device comprising a recording and actuating member which generally consists of a blade or lug mounted on a disc fast with a shaft rotating synchronously with the movement of the cards along the track, this recording and actuating member normally occupying an inoperative position on the disc, but being adapted to be brought into a position, called the active position, under the action of a recording control member, such as an electromagnet, for example, which is in turn controlled by the reading station. When it is thus brought into the active position, the recording and actuating member driven by the disc moves, in its travel, a lever disposed in its path and the movement of which is imparted to the deflector so as to bring it, for a very brief time, into a position in which it brings about the deflection of a card towards the associated compartment, the reading control member being angularly offset around the disc in relation to the lever by an amount such that the time taken by the recording and actuating member to travel from the recording control member to the lever is equal to the time taken by the said card to travel from the reading station to the compartment under consideration.

In sorting machines comprising a large number of receiving compartments, it has been found advantageous for simplifying the construction, to employ disc-type memories which are identical. These disc-type memories are then mounted, in a proportion of one memory disc per compartment, on a common shaft wich drives them all at the same speed, each memory disc comprising a series of recording and actuating members at least equal in number to the compartments and equally distributed around the disc.

In a first type of disc memory, the recording and actuating members consist of lugs pivotally mounted on the side of each disc, each lug being adapted to remain in either one of two positions under the action of a spring, so as to project beyond the periphery of the disc and thus to shift, in its travel, the control lever of the deflector, or on the other hand not to project from said periphery.

A second type of disc memory is known, in which each disc is provided with cylindrical seats disposed perpendicularly to the plane of the disc, in the neighbourhood of its periphery and at the same distance from the shaft. A cylindrical disc so disposed within each seat as to be able to slide axially may be pulled to a sufficient extent from its seat under the action of an electromagnet to be able to actuate in its travel the control lever of the deflector, whereafter it is returned into the interior of its seat by known means.

In a third type of memory, the recording and actuating members consist of needles or blades disposed radially and applied normally, under the action of a return spring, against a fixed guide plate on which they slide during the rotation of the disc. Each needle or blade may be withdrawn from the said plate under the action of an electromagnet so as to be engaged in a guide element which maintains it in spaced relationship to the said plate until it actuates, in passing, the control lever of the deflector.

However, the correct operation of a disc memory belonging to any one of these types requires that all the actuating members which are displaceable by the same control member should have identical mechanical characteristics. Consequently, all the members constituting these memories must be machined with very high precision. Moreover, since the positioning of the recording and actuating members on the disc must be precise, it is necessary, during the assembly to effect delicate adjustments and to provide on the disc points of engagement or securing means, whereby the manufacture and assembly of these disc-type memories are rendered particularly lengthy and costly having regard to the large number of component parts. Finally, these types of memories have the disadvantage of having a relatively long response time and therefore cannot be reliably employed in high-speed machines in which the rate of processing is at least of the order of 2000 cards per minute.

The present invention has for its object to obviate these disadvantages and proposes a disc-type memory which is characterised mainly by the great readiness with which it can be constructed and a considerable reduction of the number of component parts, by virtue of which its cost can be lowered. Moreover, this memory affords the advantage, over hitherto constructed types of disc memories, that it is more robust and can be employed in rapid machines, while retaining high operating reliability.

In accordance with the invention, there is provided a delayed action actuating device which receives electric control pulses and is adapted to store the order and to transmit it with delay, in the form of a mechanical action, to a member to be controlled, the said device comprising a rotative support mounted on a driving shaft and provided with a series of radially disposed and angularly spaced actuating blades, each of which is mounted on the support in such manner as to be able to pivot about its end which is closer to the axis of rotation, while the other end may be moved between an inoperative position and an active position which are situated respectively on either side of a plane perpendicular to the axis, a blade-moving member which receives the control pulses being arranged to cause a blade to be brought into the active position in response to the reception of a pulse, the member to be controlled being situated in the path of the ends of the blades in the active position so as to be actuated by the latter in their travel, and being offset at a predetermined angle in relation to the recording control member, the said device also comprising a return member for restoring the blades to their inoperative position immediately after the actuating of the member to be controlled, the said device being characterised in that the blades, which at least partially have ferromagnetic properties, are positioned between two rings fast with the support, the said rings consisting of a material which at least partially has ferromagnetic properties and being sufficiently spaced apart to enable each blade which is brought into either of its two positions to be situated in immediate proximity to a ring and to be maintained in this position by a magnetic interaction between the said blade and the said ring.

In a preferred embodiment of the invention, there is employed for the production of each of the rings a magnetically hard ferrite of the ceramic type.

Figure 2:
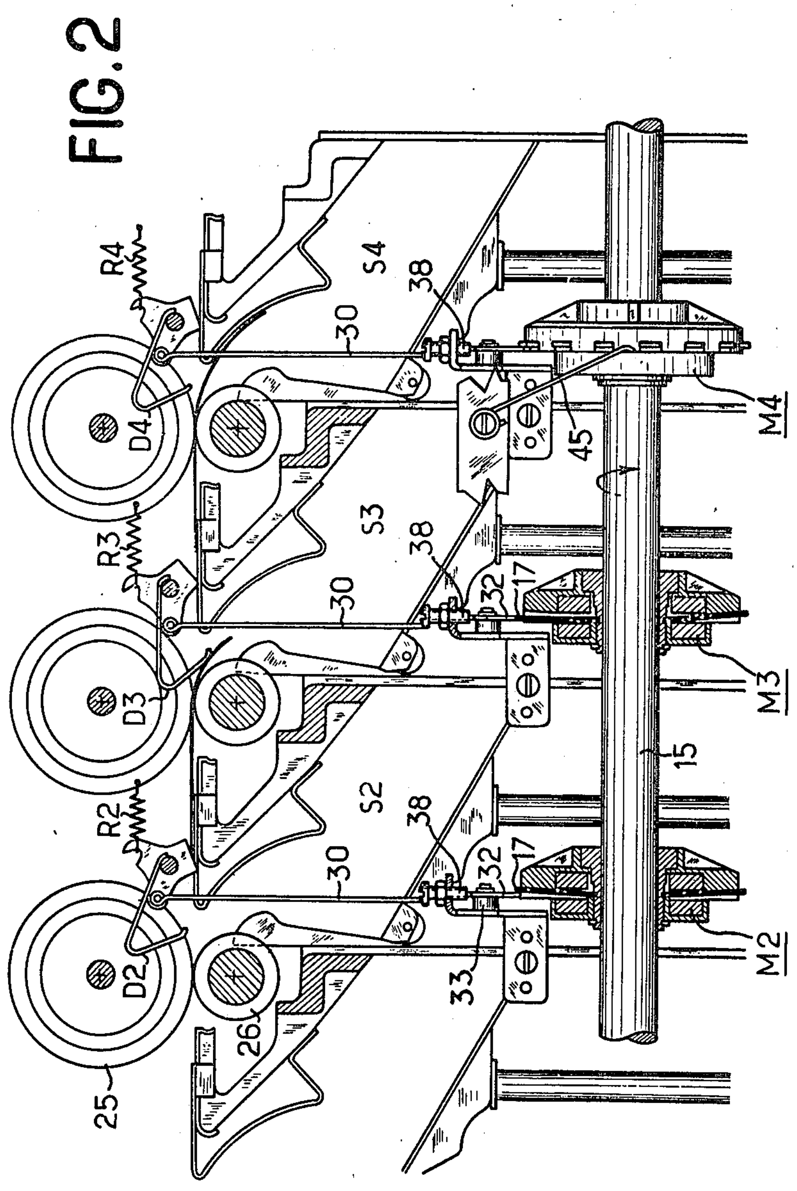
Figure 3:
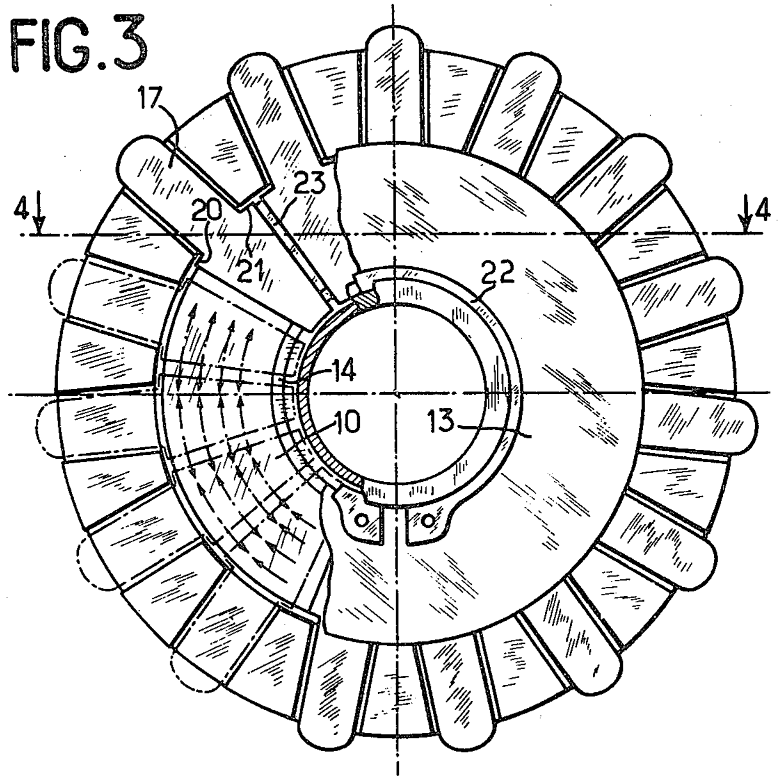
Figure 4:
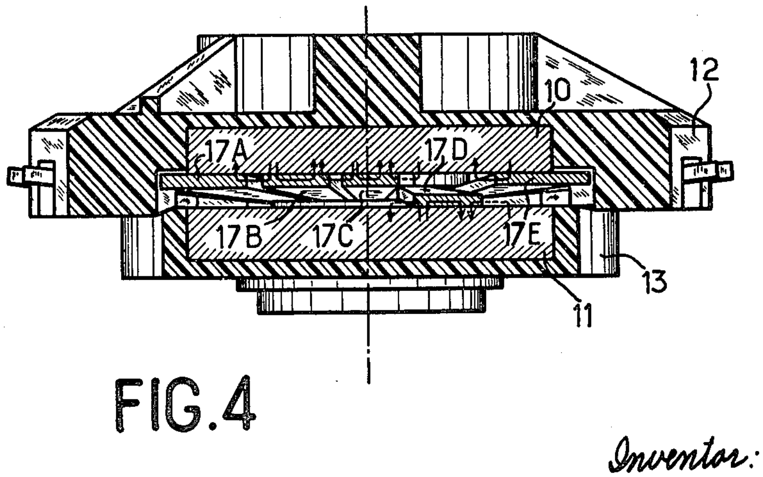
Figure 5:
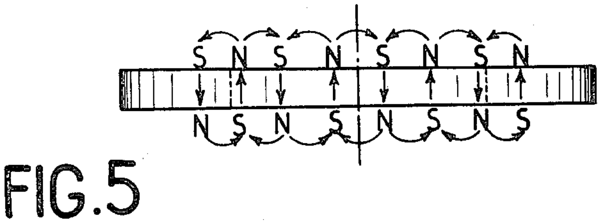
Figure 6:
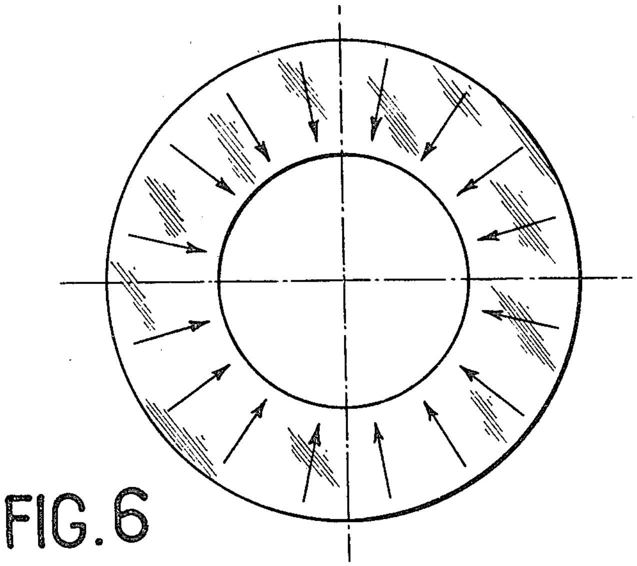
Figure 7:
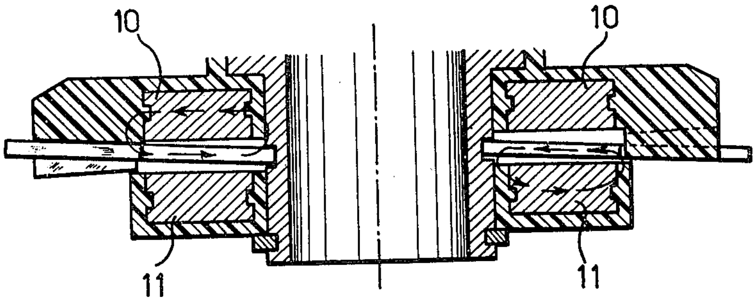
Figure 8:
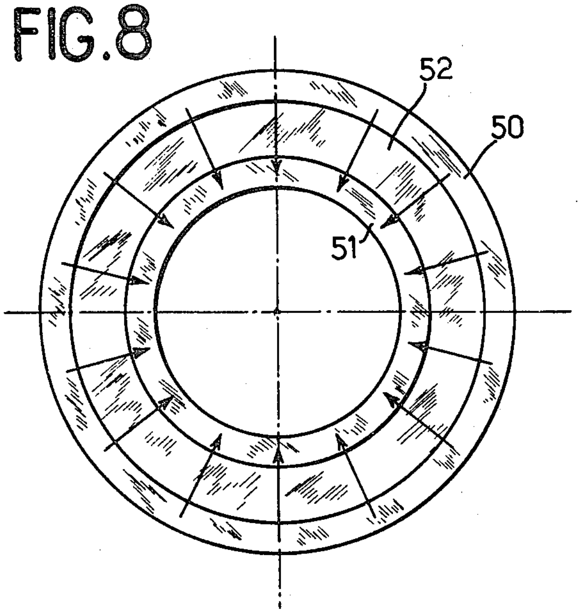
Figure 9:
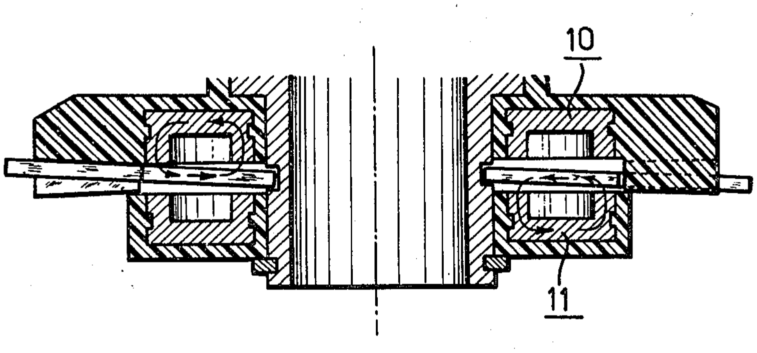

Further features and advantages of the invention will become apparent in the following description which is given by way of example and with reference to the accompanying drawings, in which:

FIGURE 1 is a view in perspective, with parts broken away, showing a disc-type memory designed in accordance with the invention, FIGURE 2 is an elevational view showing disc-type memories controlling card-selecting devices in a record card machine, FIGURE 3 is an elevational view, with parts broken away, of a disc-type memory designed in accordance with the invention, FIGURE 4 is a view of the disc-type memory illustrated in FIGURE 3, in section along the line 4—4, FIGURE 5 is a mode of transverse and zonewise magnetisation for a ring which may be employed in a disc-type memory designed in accordance with the invention, FIGURE 6 is a view of a radially magnetised ring, FIGURE 7 is a sectional view of a memory disc showing the use of magnetic rings of the type illustrated in FIGURE 6, FIGURE 8 is a view of another form of construction of a radially magnetised ring, and FIGURE 9 is a sectional view of a memory disc showing the use of magnetic rings of the type illustrated in FIGURE 8.

FIGURE 1 is intended to show the main features of a disc-type memory designed in accordance with the invention. In the embodiment illustrated in this figure, the memory comprises two magnetic rings 10 and 11 let into one of two support blocks 12 and 13 respectively of plastics which are fast with a metal sleeve 14, which is in turn fixedly mounted on a driving shaft 13 by means of a screw 16. The said memory also comprises a series of blades such as 17 disposed between the two rings 10 and 11 and regularly distributed around the sleeve 14, each blade being engaged at one of its ends in a circular groove 18 in the sleeve 14. The support block 12 is provided with projecting portions 19 which form distance members which are intended to maintain the rings 10 and 11 at a sufficient distance apart, as shown in FIGURE 4, in order to enable each blade to pivot about its end engaged in the groove 18, so as to be brought into contact with, or into immediate proximity to, either the ring 10 or the ring 11. In the described example it will be assumed that the blades may be brought into contact with either one of these two rings. As shown in FIGURE 1, the projecting portions 19 also guide the blades in their movement between the two rings. It will also be assumed in the described example that the blades are made of soft iron or of any ferrous metal having negligible magnetic remanence. The assembly consisting of the sleeve 14 and the two support blocks 12 and 13 will be called the rotative support.

FIGURE 3 shows that the blades are each provided with two shoulders 20 and 21 which, when the support block 13 is positioned at the time of the assembly of the memory, prevent the blades from leaving the groove 18. Each blade can then be shifted, by pivoting about its end engaged in the groove 18, only from a first position in which it is in contact with one of the magnetic rings, to a second position in which it comes into contact with the other ring, or vice versa. It should here be pointed out that this method of fixing the blades renders unnecessary the use of pivot pins, whereby the fitting of the blades in the memory is greatly facilitated. Moreover, it affords the advantage of avoiding the necessity to lubricate the members. Finally, owing to its two shoulders 20 and 21, each blade can move from one position to the other substantially without encountering any appreciable resistance. Therefore, the device retains substantially constant operating characteristics in the course of time. The friction of each blade on the projecting portions 19 serving as a guide therefore may in addition be greatly reduced by making the two support blocks 12 and 13 of a non-magnetisable material of high mechanical strength, which in addition affords sufficient stability and hardness to satisfy these condtions. By way of example, there may with advantage be employed a plastics such as an acetal resin known under the trade name "Delrin."

FIGURE 3 also shows that each blade is rounded at its free end in such manner that when it has been brought, by an electromagnet hereinafter referred to, into an active position for actuating a control lever of a deflector, it can shift the said lever without producing violent shocks.

Referring again to FIGURE 1, it will be seen that the support block 13 is maintained in position against the support block 12 and locked in this position on the sleeve 14 by means of a resilient ring 22.

Owing to the magnetisation of the rings 10 and 11, the blades are maintained in contact with the ring against which they are brought. Consequently, in moving from one position to the other, the blades pass through a dead-centre position in which each blade is acted on with equal force by each of the two rings 10 and 11. From this position, which is midway between the rings 10 and 11, each blade is attracted by the ring towards which it is then shifted, with a force which is greater in proportion as its distance therefrom decreases. In the described arrangement, it may be assumed that when the assembly turns about the shaft 15 the action of centrifugal force on the blades is negligible.

FIGURES 3 and 4 show the use of magnetic rings which have been magnetised in accordance with the configuration shown in FIGURE 5. Referring to FIGURE 5, there will be seen a ring which has been magnetised in the direction of its thickness in radial zones and in such manner that the polarity of the successive zones regularly alternates on each face of the ring, this polarity being indicated in FIGURE 5 by the letters N and S, to indicate a North magnetic pole and a South magnetic pole respectively. In FIGURE 5, the directions of the lines of force of the magnetic induction are indicated by arrows, these lines being oriented from a South magnetic pole towards a North magnetic pole within the ring, and from a North magnetic pole towards a South magnetic pole outside the ring. It will be assumed that in the described example the rings 10 and 11 have been magnetised in this way, these rings being made of a material which is capable of retaining very stable magnetisation, for example of a magnetically hard ferrite of the ceramic type, such as that known used the trade name "Ferroxdure." In FIGURE 3, the arrows only indicate the direction of the lines of force outside the ring, which extend from the zones corresponding to North magnetic poles on that face of the ring which is partly visible in FIGURE 3, and end at zones which correspond to South magnetic poles on this same face. Under these conditions, if a blade consisting of a material having high magnetic permeability is situated close to these magnetic poles, this blade canalises some of the external lines of force. When subjected by the said ring to a magnetic attractive force whose intensity increases as it moves towards the said ring, this blades come into contact with the ring and is finally maintained in contact therewith by magnetic action. FIGURE 4 is a section through FIGURE 3 along the line 4—4, which shows a series of blades 17A, 17B, 17C, 17E magnetically maintained against the ring 10, and a blade 17D magnetically maintained against the ring 11. However, it is to be noted that each blade, which is maintained in contact with one of the rings, such as the ring 10, for example, also canalises some of the external lines of force which extend from the North magnetic poles of the face opposite the other ring into the neighbourhood of the said blade. However, owing to the size of the air gaps then existing between the blade and the magnetic poles of this other ring, the magnetic attractive force exerted by this other ring on the blade cannot reach a high intensity, so that the blade remains in contact with the ring against which it has been brought. However, it is to be noted that in order that this position may be effectively maintained, the distribution of the North and South magnetic poles on the face situated on the side of the blades has been so established that each blade brought into contact with the said ring canalises the maximum number of lines of force which, on this face, extend from a zone corresponding to North magnetic poles and situated in immediate proximity to a neighbouring zone corresponding to South magnetic poles.

In addition, this arrangement prevents a blade from magnetically influencing the neighbouring blades in its movement. In the described example, this influence is reduced on the one hand by providing a sufficient distance between neighbouring blades, such as that denoted by the reference 23 in FIGURE 3, and on the other hand by employing rings magnetised with the configuration illustrated in FIGURES 3, 4 and 5 and in which the number of pairs of North-South magnetic poles situated on that face of the ring to which the blades may be applied is equal or substantially equal to the total number of blades mounted in the memory.

In one embodiment, there have been provided fifteen blades 17 and fifteen pairs of magnetised elements per magnetic ring. FIGURE 2 is intended to show by way of example the use of disc memories of the type described in a record-card sorting machine. It will be assumed that this sorting machine comprises twelve card-receiving compartments S1, S2, S3, S4, S5, S6, S7, S8, S9, S10, S11 and S12, only three of which are shown, all the others being identical. Associated with each compartment is a deflector, only three such deflectors D2, D3 and D4 associated with the compartments S2, S3 and S4 respectively having been shown. Each deflector is maintained by a spring denoted by R1 to R12 respectively, which urges it into a position in which it is normally inoperative. In known manner, the cards emanating from a supply magazine (not shown) are advanced, after having been read by reading devices of known type (not shown), from left to right as seen on the drawing of FIGURE 2, by means of two sets of feed rollers, such as the set of rollers denoted by 25 and 26. Each deflector may be actuated, under conditions which will hereinafter be explained, by means of twelve disc memories, each associated with one particular compartment, of which only three, M2, M3 and M4, have been shown in FIGURE 2. These disc memories are mounted on a common shaft 15 which drives them all at the same speed of rotation, in the direction indicated by the arrow, each of them being adapted to actuate the corresponding deflector through a control rod 30. Referring now to FIGURE 1, it will be seen that for this purpose each control rod 30 is pivotally mounted at its lower end on a pivot member 31 secured to one of the ends of an actuating lever 32. The said lever 32 is provided with a bearing member 33 which enables it to be mounted on a horizontal pivot pin 34 about which it can rock, the pivot pin 34 being in turn secured to a support member 35 fast with the frame of the machine. The lever 32 is rounded at its other end 36 and its position in relation to the disc memory is made such that when the memory turns and at least one of the blades 17 has been brought against the ring 11, in a so-called active position, this blade encounters in the course of its rotation the end 36 of the lever 32, while the other blades, which have remained in contact with the ring 10, in a so-called inoperative position, pass beside the lever 32 without actuating it. The end 36, which has been lifted by the blade which has been brought into the active position, causes the lever 32 to pivot about its pin 34, so that the control rod 30 is shifted downwards and brings the deflector to which it is secured into a position, called the deflection position, in which the cards encountering the said deflector are deflected and fall into the corresponding compartment. In FIGURE 2, the disc memories M2 and M3 have been shown in section in order to illustrate the relative positions of the blades 17 and of the actuating levers 32. The two blades which may be seen in this figure and which form part of the memory M2 are shown in the inoperative position and therefore cannot actuate the corresponding lever when the shaft 15 turns. On the other hand, one of the two blades shown, which form part of the memory M3, is illustrated in the active position, at the precise instant when it actuates the corresponding lever. Under these conditions, the deflector D3 is situated in the deflection position, the other two, D2 and D4, being in the inoperative position.

The blades are brought into the active position by means of an electromagnet 40, shown in FIGURE 1, which is secured to a support plate 41 situated perpendicularly to the driving shaft 15 and fast with the frame of the machine. There are therefore as many electromagnets as compartments, each electromagnet being associated with the disc memory of the corresponding compartment. Each electromagnet is energised by electric pulses applied by the reading devices of the reading station, which determine, from the selecting indications present on each of the cards extracted from the magazine, the compartment into which it is to pass. Since the levers which actuate the control rods of the deflectors are disposed in the same alignment in the described construction, as may be seen in FIGURE 2, each electromagnet must be fixed on its support plate in a location whose angular position is determined as a function of the duration of the travel of a card from the instant when an electric pulse applied by the reading devices which have read this card is transmitted to the said electromagnet until the instant when this card is actually selected by the deflector of the corresponding compartment. It will be assumed that, in known manner, there are as many blades, on a given disc, between the position of the electromagnet and the actuating position of the lever as there may be cards circulating between the reading devices and the deflector associated with the said lever.

In FIGURE 2, the electromagnets have intentionally not been shown, in order not to overload the drawing. When one of the blades of a disc memory has been brought into the active position by the corresponding electromagnet and has been carried along by the rotational movement of the shaft 15 so as to actuate the lever of the deflector associated with this memory, this blade remains in the active position until it encounters a return member, which returns it into the inoperative position. FIGURE 2 shows that, in the described example, this return member consists of a metal strip 45 secured to the frame of the machine. A strip of this type is provided for each memory. However, for the sake of simplicity, only the blade associated with the memory M4 has been shown in FIGURE 2.

Owing to the small distance between the rings, each blade may be rapidly shifted from one position to the other by the electromagnet 40 or the strip 45, so that this memory may be employed in rapid machines while still retaining high operating reliability. However, the time necessary for the movement of the blades may be substantially reduced by reducing the magnetic force which maintains the blades against either of the rings, by means of a thin deposit of non-magnetisable metal, such as copper, or even plastics, on the rings or the blades. The arrangement not only facilitates the detachment of the blades from the ring against which they have been applied, but also affords the advantage that the electromagnet 40 may be energised with a current of reduced strength.

Referring now to FIGURES 1 and 2, it will be seem that the support member 35 is provided with an adjustable abutment screw 38 which limits the position of the deflector when the latter returns ino the inoperative position under the action of its spring.

In the disc memory just described, the blades are maintained in the active position or in the inoperative position by rings which have transverse and zone-wise magnetisation, as has been explained in the foregoing with reference to the drawings of FIGURES 3, 4 and 5. However, it is to be noted that this mode of magnetisation is not the only one that can be used and that there may also be used rings having appropriate radial magnetisation, for example such as that illustrated in FIGURE 6.

FIGURE 6 shows a ring which has been radially magnetised, so that the external lines of force emanating from the peripheral portion of the ring converge towards the central portion of the ring, as shown by the arrows, which indicate in the figure the direction of the external lines of force. However, the direction of the external lines of force could without disadvantage be reversed, i.e. the said lines could extend from that portion of the ring which is closest to the centre and diverge towards the peripheral portion of the said ring.

FIGURE 7 illustrates in section, along a plane extending through the axis, a disc memory in which the rings 10 and 11 have been magnetised in accordance with the configuration illustrated in FIGURE 6. In FIGURE 7, there have been indicated by arrows the directions of the lines of force in each of the two blades which have been shown, as also in each of the rings into contact with which they have been respectively brought.

It will be assumed that the ring shown in FIGURE 6 is totally magnetised, which means that, if a radial plane perpendicular to the plane of the figure and extending along the axis of the ring is considered, the external lines of force extending on the visible face of the ring shown in FIGURE 6 retain the same distribution in this plane regardless of the radial position of the latter. It is also possible to employ rings magnetised in the manner indicated in FIGURE 6, but in which each ring, instead of being totally magnetised, is magnetised in radial zones, which zones are distributed, onthe surface of the ring, in such manner that each blade in the memory is situated opposite a corresponding magnetised zone.

However, it is to be noted that this mode of magnetisation by radial zones requires that each magnetised zone should be situated exactly opposite a blade in order that all the blades may have identical operating characteristics.

FIGURE 8 shows a ring in which the peripheral portion 50 is separated from the central portion 51 by a deep circular groove 52, and which has been radially magnetised, in such manner that the external lines of force emanating from the peripheral portion 50 converge towards the central portion 51, as shown by the arrows. FIGURE 9 shows a sectional view along a plane extending along the axis, of a disc memory in which the rings 10 and 11 are of the type illustrated in FIGURE 8. In FIGURE 9, the arrows indicate the direction of the lines of force in each of the two blades which have shown, as also in each of the rings into contact with which they have been respectively brought. It is to be noted that, in order to enable the various component parts of the memory to retain substantially constant operating characteristics in the course of time, the megnetic rings are made of a material which is capable of retaining very stable magnetisation. Magnetically hard ferrites of the ceramic type are known for this purpose, which satisfy these conditions, for example that known under the trade name "Ferroxdure."

However, in a memory device of the type just described, the blades may be maintained in either of their two positions in an equivalent manner by permanently magnetising the blades, instead of the rings, in the same direction over only a part of their length, in such manner as to enable the ring into whose immediate vicinity each blade is brought to canalise some of the external lines of force which are set up between that portion of the said blade which is closest to the said ring and the end about which it pivots.

Although the essential features of the invention have been described in the foregoing and illustrated in the drawings, it is obvious that the person skilled in the art may make therein any modifications of form and of detail which may be considered desirable without departing from the scope of the invention.

I claim:

1. A delayed-action actuating device comprising a rotative support fixedly mounted on a driving shaft and formed with a circular groove, a series of actuating blades disposed radially on the said support and angularly displaced, each blade being engaged in the said groove at one of its ends to enable its other end to be shifted between an inoperative position and an active position which are situated, respectively, on either side of a plane perpendicular to the axis, a control member designed to receive an electric pulse, in the course of an operating cycle, and disposed in proximity to the displaceable ends of the blades to cause a blade to be brought selectively into the active position in response to a pulse received, and a member to be actuated disposed in the path of that end of the blade which is shifted into the active position in order to be actuated by the latter in its travel and offset at a predetermined angle in relation to the control member, the said device being characterised in that the said blades consist of a ferromagnetic material and in that the said support comprises in addition two rings at least partially having ferromagnetic properties, the said rings being disposed on either side of the blades in such manner that each blade, when brought into one of its two positions, is situated in immediate proximity to a ring and is maintained in this position by magnetic attraction between the said blade and the said ring.

2. A delayed-action actuating device according to claim 1, wherein the rotative support is provided with means for guiding the blades, the said means being designed to maintain each blade in engagement in the groove at one of its ends, while permitting displacement of the said blade between the rings.

3. A delayed-action actuating device according to claim 2, wherein the said control member consists of an electromagnet disposed in proximity to the displaceable end of the said blades in order to shift a blade from its inoperative position to its active position in the rotation of the said support and in response to an electric pulse received.

4. A delayed-action actuating device according to claim 2, wherein each of the said rings consists of a magnetically hard ferrite of the ceramic type and is so magnetised as to have pairs of separate magnetised elements at least equal in number to the blades, the said elements being directed parallel to the axis of rotation, but oriented alternately in position in such manner that a North pole and a South pole appear on the face opposite the blades per pair of neighbouring elements.

5. A delayed-action actuating device according to claim 2, wherein the lines of force of the magnetic flux in each ring are radially oriented.

6. A delayed-action actuating device according to claim

2, wherein the said blades are permanently magnetised in only one direction on only one portion of their length in order to enable the ring into whose immediate vicinity each blade is brought to canalise some of the external lines of force which are set up between that portion of the said blade which is closest to the said ring and the end about which it pivots.

References Cited

UNITED STATES PATENTS

| | | | |
|---|---|---|---|
| 2,988,932 | 6/1961 | Swanson | 74—568 |
| 3,445,825 | 5/1969 | Cedrone | 74—568 X |

RICHARD A. SCHACHER, Primary Examiner

U.S. Cl. X.R.

209—74